United States Patent
Slabaugh et al.

(10) Patent No.: US 6,923,264 B2
(45) Date of Patent: Aug. 2, 2005

(54) METHODS OF FRACTURING SUBTERRANEAN ZONES, FRACTURING FLUIDS AND BREAKER ACTIVATORS THEREFOR

(75) Inventors: Billy F. Slabaugh, Marlow, OK (US); Paul D. Lord, Duncan, OK (US); John M. Wilson, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 175 days.

(21) Appl. No.: 10/379,958

(22) Filed: Mar. 5, 2003

(65) Prior Publication Data

US 2004/0211566 A1 Oct. 28, 2004

(51) Int. Cl.$^7$ .............................................. E21B 43/27
(52) U.S. Cl. ................. 166/308.3; 166/280.1; 166/307; 507/241; 507/256; 507/269; 507/921
(58) Field of Search .............................. 166/280.1, 283, 166/307, 308.2, 308.3, 308.5; 507/241, 256, 269, 921

(56) References Cited

U.S. PATENT DOCUMENTS 4,428,432 A * 1/1984 Pabley ........................ 507/215
5,386,874 A    2/1995 Laramay et al. ............ 166/300
5,393,439 A    2/1995 Laramay et al. ............ 507/211
6,534,448 B1 * 3/2003 Brezinski ...................... 507/90

FOREIGN PATENT DOCUMENTS

EP    0916806 A2    5/1999
EP    0799968       8/1999

OTHER PUBLICATIONS

Foreign Search Report and Opinion (International Appl. No. PCT/GB2004/000695), Feb. 23, 2004.

* cited by examiner

*Primary Examiner*—Zakiya Walker
(74) *Attorney, Agent, or Firm*—Robert A. Kent; C. Clark Dougherty, Jr.

(57) ABSTRACT

A method of fracturing subterranean zones at temperature below about 200° F. wherein the fracturing fluid comprises water, a viscosity increasing gelling agent, a particulate proppant material, a delayed viscosity breaker for causing the fracturing fluid to revert to a thin fluid and a breaker activator comprising a mixture selected from the group of a mixture of cobaltous acetate and the sodium salt of ethylenediaminetetraacetic acid and a mixture of thioglycolic acid and sodium molybdate.

18 Claims, 1 Drawing Sheet

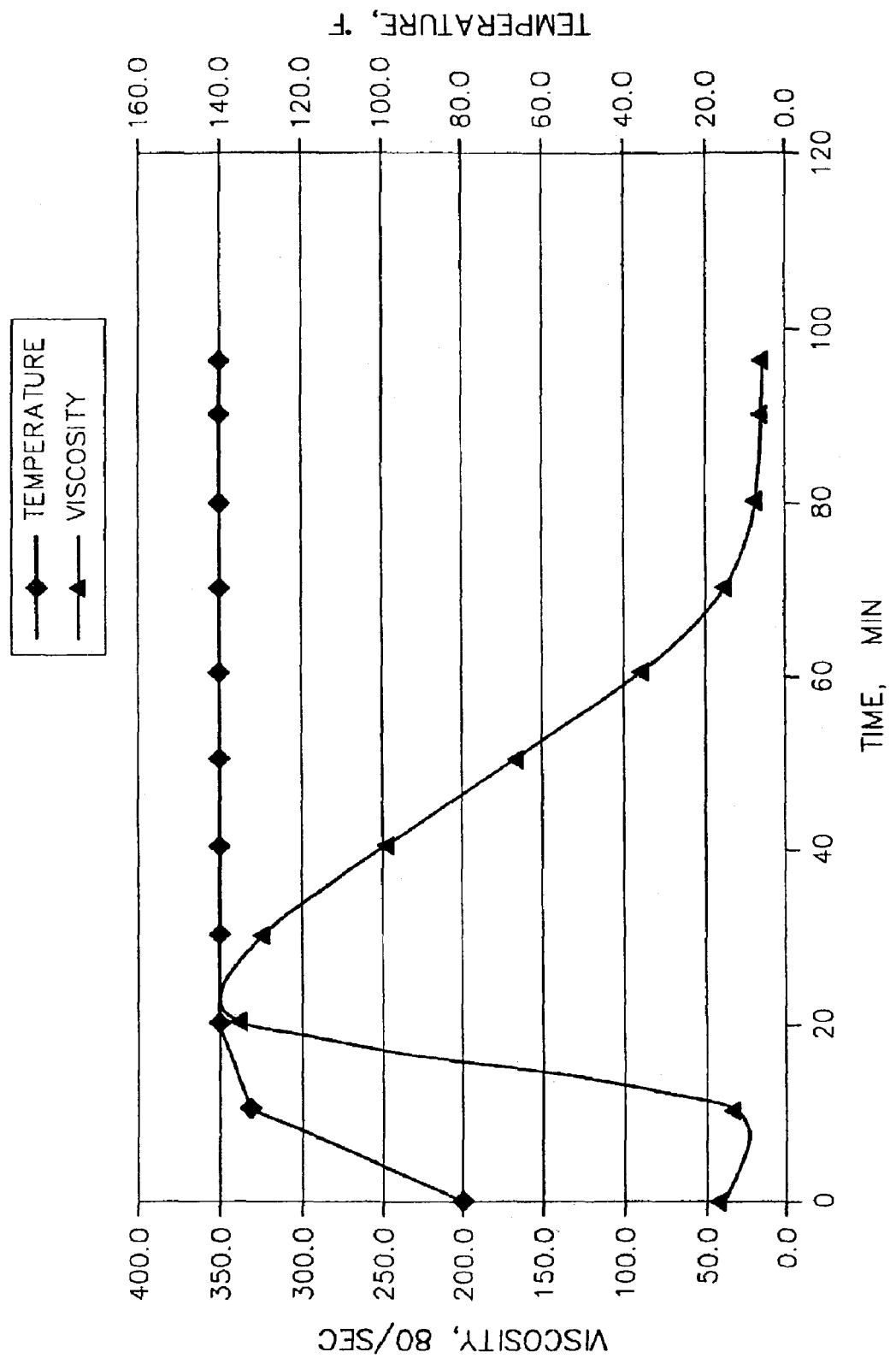

METHODS OF FRACTURING SUBTERRANEAN ZONES, FRACTURING FLUIDS AND BREAKER ACTIVATORS THEREFOR

BACKGROUND OF THE INVENTION

1. Field of the Invention

The present invention relates to fracturing subterranean formations to increase the production of oil and gas therefrom, and more particularly, to breaker activators for use in low temperature formations.

2. Description of the Prior Art

Hydrocarbon producing wells are often stimulated by hydraulic fracturing treatments. In hydraulic fracturing treatments, a viscous fracturing fluid which also functions as a carrier fluid is pumped into a producing zone to be fractured at a rate and pressure such that one or more fractures are formed in the zone. Particulate solids, e.g., graded sand, for propping the fractures, commonly referred to in the art as proppant are suspended in the portion of the fracturing fluid so that the particulate proppant material is deposited in the fractures when the fracturing fluid is broken. That is, a delayed viscosity breaker is included in the fracturing fluid whereby the fracturing fluid reverts to a thin fluid which is returned to the surface. When the fracturing fluid is broken, the particulate proppant material is deposited in the fractures and functions to prevent the fractures from closing so that conductive flow channels are formed through which produced hydrocarbons can readily flow.

In some hydrocarbon producing subterranean formations, and particularly those which are offshore, the temperatures in the formations are very low. While delayed viscosity breakers such as alkali metal and ammonium persulfates, alkali metal chlorites and the like function very well to cause fracturing fluids to break at relatively high temperatures, at low temperatures the delayed viscosity breakers require very long times to break the fracturing fluids and as a result the delayed viscosity breakers are not useful.

Thus, there are needs for improved delayed viscosity breakers which function to quickly reduce the viscosities of fracturing fluids at low temperatures.

SUMMARY OF THE INVENTION

The present invention provides improved methods of fracturing subterranean zones having temperatures below about 200° F., improved fracturing fluids and breaker activators therefor. An improved method of fracturing a subterranean zone penetrated by a well bore comprises the following steps. A fracturing fluid is provided comprised of water, a viscosity increasing gelling agent, a particulate proppant material, a delayed viscosity breaker for causing the fracturing fluid to revert to a thin fluid and a breaker activator comprised of a mixture of cobaltous acetate and the sodium salt of ethylenediaminetetraacetic acid or a mixture of thioglycolic acid and sodium molybdate. The fracturing fluid is pumped into the subterranean zone at a rate and pressure sufficient to create and extend at least one fracture in the subterranean zone. The fracturing fluid is then allowed to break whereby the particulate proppant material is deposited in the fracture and the fracturing fluid is recovered from the subterranean zone.

A fracturing fluid of this invention for fracturing a subterranean zone penetrated by a well bore comprises water, a viscosity increasing gelling agent, a particulate proppant material, a delayed viscosity breaker for causing the fracturing fluid to revert to a thin fluid and a breaker activator comprising a mixture of cobaltous acetate and the sodium salt of ethylenediaminetetraacetic acid or a mixture of thioglycolic acid and sodium molybdate.

The breaker activators of this invention for activating delayed breakers include, but are not limited to, alkali metal and ammonium persulfate breakers, alkali metal chlorite breakers, alkali metal hypochlorite breakers and a calcium hypochlorite breaker.

The objects, features and advantages of the present invention will be readily apparent to those skilled in the art upon a reading of the description of preferred embodiments which follows.

DESCRIPTION OF PREFERRED EMBODIMENTS

As mentioned above, an improved method of fracturing a subterranean zone penetrated by a well bore at temperatures below about 200° F. is provided by the present invention and includes the following steps. A fracturing fluid is provided comprising water, a viscosity increasing gelling agent, a particulate proppant material, a delayed viscosity breaker for causing the fracturing fluid to revert to a thin fluid and a breaker activator comprising a mixture of cobaltous acetate and the sodium salt of ethylenediaminetetraacetic acid or a mixture of thioglycolic acid and sodium molybdate. The fracturing fluid is pumped into the subterranean zone at a rate and pressure sufficient to create and extend at least one fracture in the subterranean zone. The fracturing fluid is then allowed to break whereby the particulate proppant material is deposited in the fracture and the fracturing fluid is recovered from the subterranean zone.

When delayed viscosity breakers such as encapsulated persulfates, chlorites and hypochlorites are utilized in fracturing fluids subjected to temperatures below about 200° F., the breakers react so slow that they are not useful. However, it has been discovered that certain breaker activators can be utilized in combination with the persulfate and chlorite delayed viscosity breakers to achieve quick breaks of fracturing fluids and the like at the low temperatures. Examples of the delayed viscosity breakers that can be utilized in accordance with this invention include, but are not limited to, alkali metal and ammonium persulfates encapsulated with a material which slowly dissolves or otherwise releases the persulfates, alkali metal chlorites, alkali metal hypochlorites and calcium hypochlorite. Of these, sodium chlorite is preferred. The delayed viscosity breaker utilized is generally present in the fracturing fluid in an amount in the range of from about 0.003% to about 0.3% by weight of water in the fracturing fluid, more preferably in an amount of about 0.12%.

As indicated above, the two breaker activator mixtures which are useful in accordance with this invention are a mixture of cobaltous acetate and the sodium salt of ethylenediaminetetraacetic acid and a mixture of thioglycolic acid and sodium molybdate. Of the two mixtures, the mixture of cobaltous acetate and the sodium salt of ethylenediaminetetraacetic acid is the most preferred.

The weight ratio of cobaltous acetate to the sodium salt of ethylenediaminetetraacetic acid in the mixture thereof is in the range of from about 1:0 to about 1:2, more preferably the ratio is about 1:0.5. The weight ratio of the thioglycolic acid to the sodium molybdate in the mixture thereof is in the range of from about 1:0 to about 1:4, preferably a ratio of about 1:2. The breaker activator mixture which is utilized is generally present in the fracturing fluid in an amount in the range of from about 0.003% to about 0.5% by weight of the water in the fracturing fluid.

The water in the fracturing fluid is selected from the group consisting of fresh water and salt water. The term "salt water" is used herein to mean unsaturated salt solutions and saturated salt solutions including brine and seawater.

Examples of viscosity increasing gelling agents which can be utilized in the fracturing fluid include, but are not limited to, guar and its derivatives, cellulose and its derivatives, xanthan gum and succinoglycon. While various guar and cellulose derivative gelling agents can be utilized, examples of preferred such gelling agents include, but are not limited to, guar, hydroxypropylguar, carboxymethylhydroxypropylguar, hydroxyethylcellulose, carboxymethylhydroxyethylcellulose, carboxymethylcellulose and hydroxyethylcellulose grafted with vinyl phosphonic acid. The gelling agent utilized is included in the fracturing fluid in the general amount in the range of from about 0.17% to about 0.84% by weight of water in the fracturing fluid, preferably in an amount of about 0.3%.

The fracturing fluid can include a cross-linking agent for cross-linking the gelling agent and increasing the viscosity of the fracturing fluid. Suitable cross-linking agents which can be used include, but are not limited to, borate releasing compounds, a source of titanium ions, a source of zirconium ions, a source of antimony ions and a source of aluminum ions. When used, the cross-linking agent is included in the fracturing fluid in an amount in the range of from about 0.5% to about 15% by weight of the gelling agent in the fracturing fluid, preferably in an amount of about 4%.

A variety of particulate proppant materials can be suspended in the fracturing fluid including, but not limited to, graded sand, bauxite, ceramic materials, glass materials, walnut hulls, polymer beads and mixtures thereof. Of these, graded sand is generally preferred. The particulate proppant material utilized is generally present in the fracturing fluid in an amount in the range of from about 12% to about 239% by weight of water therein, preferably in an amount of about 100%.

The fracturing fluids of this invention can also include other conventional additives which are well known to those skilled in the art such as bacteriacides, clay stabilizers, surfactants and the like which do not adversely react with other components in the fracturing fluids. As indicated above and as is also well known, the fracturing fluid is pumped into the subterranean zone at a rate and pressure sufficient to create and extend one or more fractures in the subterranean zone. Once the fractures are formed, the fracturing fluid therein is caused to break at temperatures below about 200° F. by the presence of the delayed viscosity breaker and breaker activator mixture included in the fracturing fluid. As the fracturing fluid reverts to a thin fluid, the particulate proppant material is deposited in the fractures and the fracturing fluid is recovered from the subterranean zone. The presence of the particulate proppant material in the fractures prevents the fractures from closing so that conductive channels are formed through which produced hydrocarbon can readily flow.

The fracturing fluids of this invention for use at subterranean temperatures below about 200° F. are basically comprised of water, a viscosity increasing gelling agent, a particulate proppant material, a delayed viscosity breaker for causing the fracturing fluid to revert to a thin fluid and a breaker activator comprising a mixture of cobaltous acetate and the sodium salt of ethylenediaminetetraacetic acid or a mixture comprising thioglycolic acid and sodium molybdate.

The amounts of the various components in the fracturing fluids of this invention are the same as those set forth above in connection with the methods of fracturing described above.

The breaker activators of this invention for activating delayed viscosity breakers comprise a mixture of cobaltous acetate and the sodium salt of ethylenediaminetetraacetic acid or a mixture of thioglycolic acid and sodium molybdate. The weight ratios of the components in the breaker activator mixtures and the amounts of the breaker activators utilized in fracturing fluids and other similar fluids are the same as those given above.

A preferred method of fracturing a subterranean zone penetrated by a well bore at temperatures below about 200° F. comprises of the steps of: (a) providing a fracturing fluid comprised of water, a viscosity increasing gelling agent, a particulate proppant material, a delayed viscosity breaker for causing the fracturing fluid to revert to a thin fluid and a breaker activator comprising a mixture selected from the group consisting of a mixture of cobaltous acetate and the sodium salt of ethylenediaminetetraacetic acid and a mixture of thioglycolic acid and sodium molybdate; (b) pumping the fracturing fluid into the subterranean zone at a rate and pressure sufficient to create and extend at least one fracture in the subterranean zone; and (c) allowing the fracturing fluid to break whereby the particulate proppant material is deposited in the fracture and the fracturing fluid is recovered from the subterranean zone.

A preferred fracturing fluid for fracturing a subterranean zone penetrated by a well bore at temperatures below about 200° F. comprises: water; a viscosity increasing gelling agent; a particulate proppant material; a delayed viscosity breaker for causing the fracturing fluid to revert to a thin fluid; and a breaker activator comprising a mixture selected from the group consisting of a mixture of cobaltous acetate and the sodium salt of ethylenediaminetetraacetic acid and a mixture of thioglycolic acid and sodium molybdate.

A preferred breaker activator for activating delayed alkali metal and ammonium persulfate breakers, alkali metal chlorite breakers, alkali metal hypochlorite breakers and a calcium hypochlorite breaker at temperatures below about 200° F. comprises a mixture selected from the group consisting of a mixture of cobaltous acetate and the sodium salt of ethylenediaminetetraacetic acid and a mixture of thioglycolic acid and sodium molybdate.

In order to further illustrate the methods and aqueous treating fluids of the present invention, the following examples are given.

EXAMPLE

A fracturing fluid was prepared comprised of water containing 4% by weight of potassium chloride, 25 pounds of guar gum gelling agent per 1000 gallons of water, 2.5 gallons of borate gel cross-linker per 1000 gallons of water, 10 pounds of sodium chlorite gel breaker per 1000 gallons of water, 1 gallon of cobalt acetate per 1000 gallons of water and 0.05 gallon of sodium ethylenediaminetetraacetic acid per 1000 gallons of water.

The fracturing fluid was preconditioned in a Waring blender and then placed on a Nordman Model 5001 viscometer equipped with a B5X bob and an R1 sample cup. While in the Waring blender, the gel breaker and gel cross-linker were added to the fracturing fluid over a ten-second time period and circulation was continued for fifteen seconds. The temperature of the Nordman viscometer water bath was heated to 140° F. and the fluid was sheared at 95 rpm (80/sec).

The description of the Nordman Model 5001 viscometer and the calculation procedure can be found in the API RP 39, Third Edition, May, 1998, issued by the American Petroleum Institute, Dallas, Tex.

The graph presented in the drawing shows the rapid break of the gelled and cross-linked fracturing fluid at 140° F. as a result of the presence of the breaker additive mixture, i.e., the mixture of cobalt acetate and sodium ethylenediaminetetraacetic acid.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. An improved method of fracturing a subterranean zone penetrated by a well bore at temperatures below about 2000° F. comprising the steps of:
   (a) providing a fracturing fluid comprised of water, a viscosity increasing gelling agent, a particulate proppant material, a delayed viscosity breaker for causing said fracturing fluid to revert to a thin fluid and a breaker activator comprising a mixture selected from the group consisting of a mixture of cobaltous acetate and the sodium salt of ethylenediaminetetraacetic acid and a mixture of thioglycolic acid and sodium molybdate;
   (b) pumping said fracturing fluid into said subterranean zone at a rate and pressure sufficient to create and extend at least one fracture in said subterranean zone; and
   (c) allowing said fracturing fluid to break whereby said particulate proppant material is deposited in said fracture and said fracturing fluid is recovered from said subterranean zone.

2. The method of claim 1 wherein said delayed viscosity breaker comprises one or more members selected from the group consisting of alkali metal and ammonium persulfates, alkali metal chlorites, alkali metal hypochlorites and calcium hypochlorite.

3. The method of claim 2 wherein said delayed viscosity breaker is present in said fracturing fluid in an amount in the range of from about 0.003% to about 0.3% by weight of water in said fracturing fluid.

4. The method of claim 1 wherein said breaker activator is a mixture of cobaltous acetate and the sodium salt of ethylenediaminetetraacetic acid.

5. The method of claim 4 wherein the weight ratio of cobaltous acetate to the sodium salt of ethylenediaminetetraacetic acid in said mixture is in the range of from about 1:0 to about 1:2.

6. The method of claim 4 wherein the weight ratio of cobaltous acetate to the sodium salt of ethylenediaminetetraacetic acid in said mixture is about 1:0.5.

7. The method of claim 1 wherein said breaker activator is a mixture of thioglycolic acid and sodium molybdate.

8. The method of claim 7 wherein the weight ratio of thioglycolic acid to sodium molybdate in said mixture is in the range of from about 1:0 to about 1:4.

9. The method of claim 7 wherein the weight ratio of thioglycolic acid to sodium molybdate in said mixture is about 1:2.

10. The method of claim 1 wherein said breaker activator is present in said fracturing fluid in an amount in the range of from about 0.003% to about 0.5% by weight of said water in said fracturing fluid.

11. The method of claim 1 wherein said water is selected from the group consisting of fresh water and salt water.

12. The method of claim 1 wherein said gelling agent comprises one or more members selected from the group consisting of guar and its derivatives, cellulose and its derivatives, xanthan gum and succinoglycon.

13. The method of claim 1 wherein said gelling agent comprises one or more members selected from the group consisting of guar, hydroxypropylguar, carboxymethylhydroxypropylguar, hydroxyethylcellulose, carboxymethylhydroxyethylcellulose, carboxymethylcellulose and hydroxyethylcellulose grafted with vinyl phosphonic acid.

14. The method of claim 1 wherein said gelling agent is present in said fracturing fluid in an amount in the range of from about 0.17% to about 0.84% by weight of water in said fracturing fluid.

15. The method of claim 1 wherein said fracturing fluid further comprises a cross-linking agent selected from the group consisting of borate releasing compounds, a source of titanium ions, a source of zirconium ions, a source of antimony ions and a source of aluminum ions.

16. The method of claim 15 wherein said cross-linking agent is included in said fracturing fluid in an amount in the range of from about 0.5% to about 15% by weight of said gelling agent therein.

17. The method of claim 1 wherein said particulate proppant material is selected from the group consisting of graded sand, bauxite, ceramic materials, glass materials, walnut hulls, polymer beads and mixtures thereof.

18. The method of claim 1 wherein said particulate proppant material is present in said fracturing fluid in an amount in the range of from about 12% to about 239% by weight of water in said fracturing fluid.

* * * * *